L. M. BETHEL.
INSECT TRAP.
APPLICATION FILED NOV. 5, 1917.
1,283,053.
Patented Oct. 29, 1918.
2 SHEETS—SHEET 2.
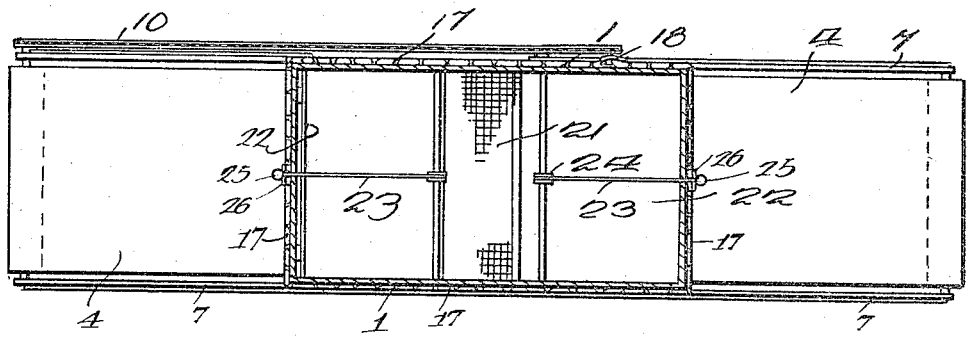
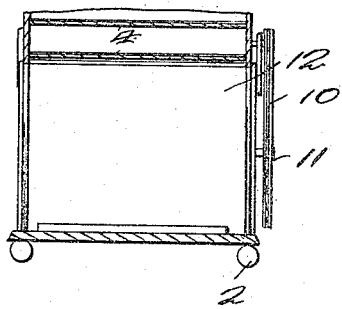
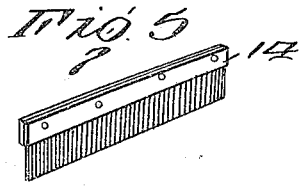
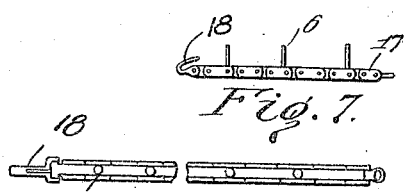
L. M. Bethel
Inventor
By Geo. P. Kimmel
Attorney

UNITED STATES PATENT OFFICE.

LEM M. BETHEL, OF MOUNTAINAIR, NEW MEXICO.

INSECT-TRAP.

1,283,053.  Specification of Letters Patent.  Patented Oct. 29, 1918.

Application filed November 5, 1917. Serial No. 200,330.

*To all whom it may concern:*

Be it known that I, LEM M. BETHEL, a citizen of the United States, residing at Mountainair, in the county of Torrance and State of New Mexico, have invented certain new and useful Improvements in Insect-Traps, of which the following is a specification.

This invention relates to insect traps and it is the principal object of the invention to provide a device capable of being arranged upon any suitable support and adapted to attract flies or other insects thereinto and retain the same therein; escape of the insect being positively prevented.

It is also an object of the invention to provide the trap with a removable insect receiving compartment which can be readily detached and the insects contained thereby destroyed.

Another and equally important object of the invention is to provide the trap with novel means for carrying insects thereon into the trap and then causing the same to be removed therefrom.

The foregoing together with additional advantageous details and arrangement of parts of the preferred embodiment of my invention will be clear from the specific description hereinafter contained, when read in connection with the accompanying drawings forming part thereof, wherein said embodiment of the invention is illustrated for the purpose of facilitating a full understanding of the present improvements.

In the drawings:—

Fig. 2 is a horizontal section therethrough,

Fig. 4 is a similar section through the trap showing the mounting of the spring motor, Fig. 5 is a detail in perspective of the flexible insect guard, Fig. 6 is a detail in elevation of the chain for securing the fly compartment to the base of the trap, parts thereof being broken away, Fig. 7 is a plan view of a portion of the chain.

Similar characters of reference refer to similar parts throughout the several views of the drawings.

Figure 1:
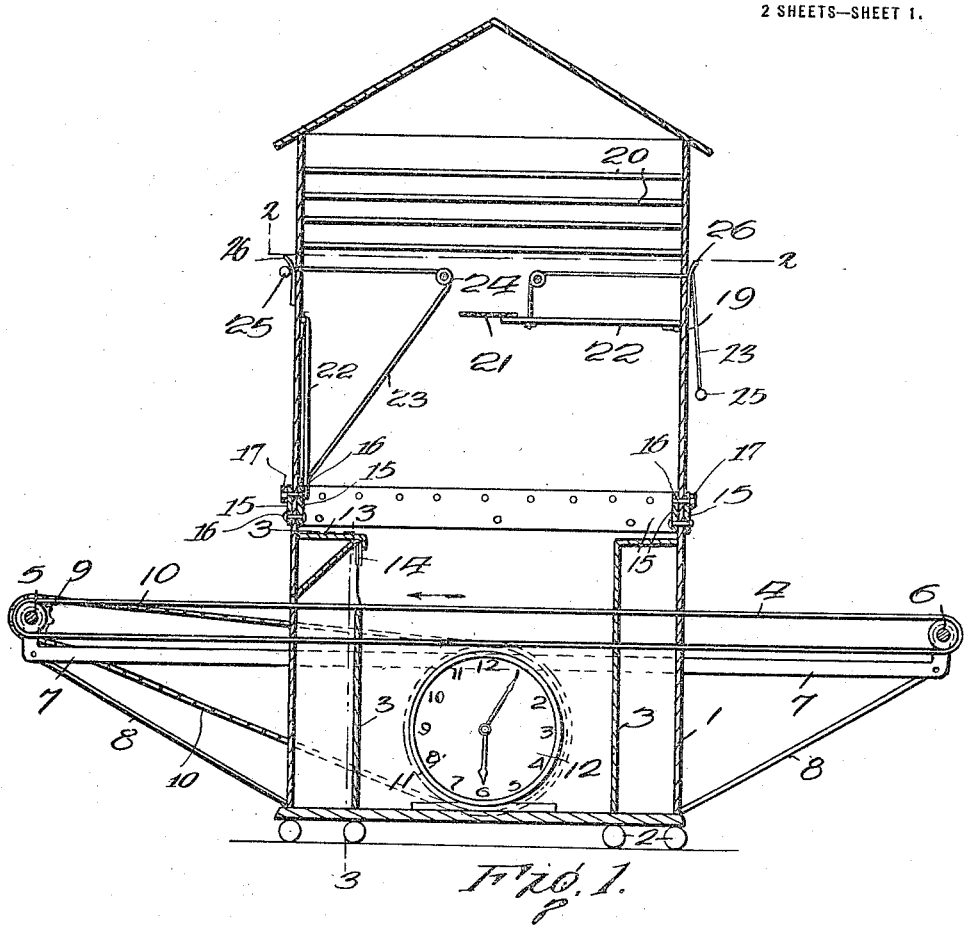
Figure 1 is a vertical section through the improved trap.
Figure 3:
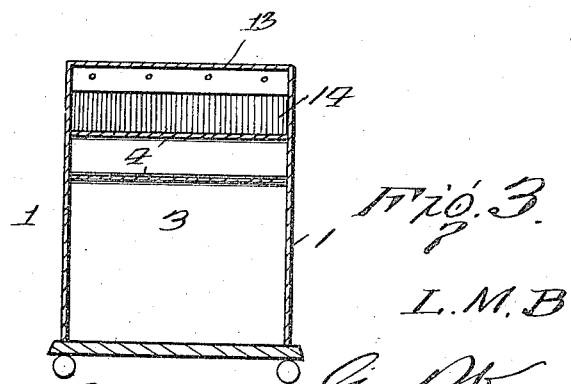
Fig. 3 is a vertical fragmental section taken on the line 3—3 of Fig. 1.

Having more particular reference to the drawings, the improved trap includes a base indicated in its entirety by the numeral 1 having a plurality of feet 2 secured to the bottom thereof and serving for an obvious purpose. Secondary walls 3 are arranged in the base 1 in spaced relation to the opposite end walls thereof and are provided with openings alined with similar openings formed in the end walls of the base 1, whereby an endless conveyer belt 4 may be passed therethrough, the opposite ends of the belt being arranged over pulleys 5 and 6 mounted on suitable shafts journaled in bearings on bracket arms 7, which bracket arms are in turn, braced by rods 8 having engagement with the same and the lower portion of the base 1. As will be noted, the pulley 5 is provided with a sprocket wheel 9 receiving one end of a chain 10 thereover while the opposite end of the chain is arranged about a sprocket wheel 11 mounted on the driven shaft of a clock 12 arranged in the base 1. In this connection, it will be appreciated that any suitable form of motor may be substituted for the clock 12, such as conditions or preference may dictate.

Secured to one of the end walls of the base 1 is a bracket 13 carrying a guard element 14, the flexible portion of which depends therefrom and is arranged in proximity to the upper face of the endless conveyer 4.

Secured to the upper marginal edges of the base are cleats 15 having series of openings formed therein, through which pins 16 carried upon a chain 17 or like body are passed, the opposite ends of the chain being provided with a suitable separable fastener 18, whereby they may be joined. By so engaging the pins 16 with the cleats and the walls of the base 1 it will be understood that the same will be securely fixed thereto.

A fly receiving compartment corresponding in size and shape to the base 1 is provided and is adapted to have the lower marginal edges thereof received by the cleats 15 whereupon locking pins 16 are passed through the proper openings in the cleats and the adjacent portions of the compartment. For the purpose of convenience, the compartment will be hereinafter designated by the numeral 19. A plurality of rods 20 or roosts are secured to the opposite walls of the fly receiving compartment 19 and as will be appreciated serve as means for supporting the insects directed thereinto. A perforate strip 21 is arranged transversely of the fly receiving compartment, while vertically swinging doors 22 are hinged to the opposite sides thereof and are engaged by cords 23 passing over pulleys 24 and through suitable openings formed in the said sides. Knobs 25 may be and preferably are arranged upon the free ends of the cords and are adapted to be engaged between the portions of clips 26, which, as will be noted, are also secured to the opposite sides of the compartment 19. By pulling the cords 23 the vertically movable doors 22 will be caused to close and as a consequence, insects contained by the compartment will be prevented from escaping upon its removal from the base 1.

In operation, motion is transmitted to the endless conveyer belt 4 by way of the clock 12, thereby moving the same through the base 1. Flies or other insects arranged on the conveyer belt will be carried into the base and removed from the conveyer by means of the guard 14, whereupon they will enter the insect receiving compartment 19, it being understood that one of the doors 22 or both of the same are open. To destroy the insects contained in the compartment 19, the same is removed from the cleats 15 by disengaging the locking pins 16 and lifting the compartment upwardly. As hereinbefore stated, previous to the removal of the compartment the doors 22 are moved to their closed positions.

Manifestly, the construction shown is capable of considerable modification and such modification as is within the scope of my claims, I consider within the spirit of my invention.

I claim:—

1. An insect trap, including a base, a conveyer supported upon and movable through the base, spaced strips arranged on the upper portion of the base, an insect receiving compartment having the lower marginal portion thereof engaged between said strips, and means passing through the strips and engageable with the lower marginal portion of said compartment for detachably securing the same to the base.

2. An insect trap, including in combination, a base, a conveyer supported on and movable through the base, a brush supported on the base having one end arranged in proximity to said conveyer, spaced strips engaged with the upper portion of the base, an insect receiving compartment having the lower marginal portions thereof received between said strips, and a chain provided with a plurality of right angularly disposed pins receivable about the outermost strip through openings formed therein and in the adjacent portions of the insect receiving compartment for detachably securing the same to said base.

In testimony whereof, I affix my signature hereto.

LEM M. BETHEL.